US010773257B2

(12) United States Patent
Paust et al.

(10) Patent No.: US 10,773,257 B2
(45) Date of Patent: Sep. 15, 2020

(54) DEVICE AND METHOD FOR STIRRING AT LEAST ONE LIQUID

(71) Applicant: Hahn-Schickard-Gesellschaft fuer angewandte Forschung e.V., Villingen-Schwenningen (DE)

(72) Inventors: Nils Paust, Freiburg (DE); Arne Kloke, Freiburg (DE); Felix Von Stetten, Freiburg-Tiengen (DE); Jens Liebeskind, Kornwestheim (DE)

(73) Assignee: Hahn-Schickard-Gesellschaft fuer angewandte Forschung e.V., Villingen-Schwenningen (DE)

( * ) Notice: Subject to any disclaimer, the term of this patent is extended or adjusted under 35 U.S.C. 154(b) by 527 days.

(21) Appl. No.: 15/092,371

(22) Filed: Apr. 6, 2016

(65) Prior Publication Data

US 2016/0214105 A1 Jul. 28, 2016

Related U.S. Application Data

(63) Continuation of application No. PCT/EP2014/068541, filed on Sep. 1, 2014.

(30) Foreign Application Priority Data

Oct. 8, 2013 (DE) .......... 10 2013 220 257

(51) Int. Cl.
*B01L 3/00* (2006.01)
*B01F 5/10* (2006.01)
(Continued)

(52) U.S. Cl.
CPC .......... *B01L 3/50273* (2013.01); *B01F 5/102* (2013.01); *B01F 9/0003* (2013.01);
(Continued)

(58) Field of Classification Search
CPC .......... B01L 3/50273; B01L 3/502715; B01L 3/502769; B01L 2200/16;
(Continued)

(56) References Cited

U.S. PATENT DOCUMENTS 573,975 A 12/1896 Maximilian et al.
5,511,880 A 4/1996 Macemon et al.
(Continued)

FOREIGN PATENT DOCUMENTS

EP 1970565 A1 9/2008
WO WO-2007106013 A1 * 9/2007 .......... B01F 13/0059
(Continued)

OTHER PUBLICATIONS

The International Preliminary Report on Patentability (Chapter II) for PCT/EP2014/068541, dated Jan. 2016.*
(Continued)

*Primary Examiner* — Claire A Norris
(74) *Attorney, Agent, or Firm* — Michael A. Glenn; Perkins Coie LLP

(57) ABSTRACT

A device for stirring at least one liquid includes a fluidics module rotatable about an axis of rotation, a liquid chamber for the liquid within the fluidics module, an introducer for introducing mutually separate phase volumes of a phase different from the liquid, said phase volumes having a different density than the liquid, into the liquid within the liquid chamber, and a driving device for subjecting the fluidics module to such a rotation that the phase volumes are moved radially inward or outward in relation to the axis of rotation through the liquid due to the different density of the phase volumes and of the liquid and due to the centrifugal forces caused by the rotation.

11 Claims, 5 Drawing Sheets

(51) Int. Cl.

| | |
|---|---|
| *B01F 9/00* | (2006.01) |
| *B01F 13/00* | (2006.01) |
| *B01F 13/02* | (2006.01) |
| *B01J 7/02* | (2006.01) |
| *B01J 16/00* | (2006.01) |
| *B01J 19/28* | (2006.01) |
| *G01N 1/38* | (2006.01) |

(52) U.S. Cl.
CPC ........ *B01F 9/0014* (2013.01); *B01F 13/0059* (2013.01); *B01F 13/0094* (2013.01); *B01F 13/0222* (2013.01); *B01F 13/0277* (2013.01); *B01F 13/0283* (2013.01); *B01J 7/02* (2013.01); *B01J 16/005* (2013.01); *B01J 19/28* (2013.01); *B01L 3/502715* (2013.01); *B01L 3/502769* (2013.01); *G01N 1/38* (2013.01); *B01L 2200/0621* (2013.01); *B01L 2200/16* (2013.01); *B01L 2300/0803* (2013.01); *B01L 2300/087* (2013.01); *B01L 2300/0877* (2013.01); *B01L 2400/0409* (2013.01); *B01L 2400/0487* (2013.01); *G01N 2001/386* (2013.01)

(58) Field of Classification Search
CPC ..... B01L 2200/0621; B01L 2300/0803; B01L 2300/087; B01L 2300/0877; B01L 2400/0487; B01L 2400/0409; B01L 2300/14; B01F 9/0003; B01F 13/0059; B01F 13/0094; B01F 13/0222; B01F 13/0277; B01F 13/0283; B01F 5/102; B01F 9/0014; B01J 16/005; B01J 7/02; B01J 19/28; G01N 1/38; G01N 2001/386; B04B 5/0407; F04F 1/06
See application file for complete search history.

(56) References Cited

U.S. PATENT DOCUMENTS

| | | |
|---|---|---|
| 8,057,757 B2 | 11/2011 | Robole et al. |
| 2009/0075801 A1* | 3/2009 | Hodko ................ B01L 3/50273 494/22 |
| 2011/0103174 A1 | 5/2011 | Jung et al. |

FOREIGN PATENT DOCUMENTS

| | | | |
|---|---|---|---|
| WO | 2008103116 A1 | 8/2008 | |
| WO | 2011117148 A1 | 9/2011 | |
| WO | 2011144396 A1 | 11/2011 | |
| WO | WO-2012131598 A1 * | 10/2012 | .......... A61M 1/3693 |
| WO | WO-2015051950 A1 * | 4/2015 | ........ B01L 3/502769 |

OTHER PUBLICATIONS

The Written Opinion for PCT/EP2014/068541, dated Nov. 2014.*
The Search Report for PCT/EP2014/068541, dated Nov. 2014.*
Demming, S. et al., "Vertical Microbubble Column—A photonic lab-on-chip for cultivation and online analysis of yeast cell cultures", Biomicrofluidics 6, 034106, 2012.
Ducree, Jens et al., "Patterning of flow and mixing in rotating radial microchannels", Microfluidics and Nanofluidics, 2, 2006, pp. 97-105.
Garstecki, P. et al., "Mixing with Bubbles: a practical technology for use with portable microfluidic devices", Lab Chip, 6, 2006, pp. 207-212.
Grumann, M. et al., "Batch-mode mixing on centrifugal microfluidic platforms", Lab on a Chip 5, 2005, pp. 560-565.
Katarci, N. et al., "Bibble Column Reactors", Process Biochemistry, 40, 2005, pp. 2263-2283.
Matthew, C. , "Pneumatically Pumping Fluids Radially Inward on Centrifugal Microfluidic Platforms in Motion", Anal. Chem, 82, 2010, pp. 8039-8041.
Noroozi, Z. et al., "Reciprocation flow-based centrifugal microfluidic mixer", Review of Scientific Instruments 80. 75102, 2009.

* cited by examiner

| | $V_2/V_1$ [ ] | |
|---|---|---|
| $2\ NH_4NO_3 \longrightarrow 4\ H_2O\uparrow +\ 2\ N_2\uparrow +\ O_2\uparrow$ | 1696 |  |
| $2\ NaN_3 \longrightarrow 2\ Na\ +\ 3\ N_2\uparrow$ | 957  275 °C |  |
| $NH_4NO_2\ (aq.) \longrightarrow 2\ H_2O\ +\ N_2\uparrow$ | 273  70 °C |  |
| $NH_4Cl\ (aq.) + NaNO_2\ (aq.) \longrightarrow N_2\uparrow +\ NaCl\ + 2\ H_2O$ | 202  70 °C |  |
| $Mg\ +\ 2\ H_2O \longrightarrow Mg(OH)_2 +\ H_2\uparrow$ | 449 |  |
| $NaBH_4 +\ 2\ H_2O \longrightarrow NaBO_2 +\ 4\ H_2\uparrow$ | 1260 |  |
| $Zn\ + 2\ HCl\ (aq.) \longrightarrow ZnCl_2 +\ H_2\uparrow$ | 132 |  |
| $CaCO_3 + 2\ HCl\ (aq.) \longrightarrow CaCl_2 +\ H_2O\ + CO_2\uparrow$ | 114 | ph |
| $2\ H_2O_2\ (30\%) \longrightarrow 2\ H_2O\ +\ O_2\uparrow$ | 111 |  |
| $MnO_2\ + 4\ HCl\ (aq.) \longrightarrow MnCl_2\ +\ 2\ H_2O\ + Cl_2\uparrow$ | 66 |  |
| $CaC_2\ +\ 2\ H_2O \longrightarrow C_2H_2\uparrow +\ Ca(OH)_2$ | 346 |  |
| commercial propellants $\longrightarrow N_2\uparrow +\ ...\uparrow +\ ...$ | 364 |  |

FIGURE 4

DEVICE AND METHOD FOR STIRRING AT LEAST ONE LIQUID

CROSS-REFERENCE TO RELATED APPLICATIONS

This application is a continuation of copending International Application No. PCT/EP2014/068541, filed Sep. 1, 2014, which is incorporated herein by reference in its entirety, and additionally claims priority from German Application No. 102013220257.1, filed Oct. 8, 2013, which is also incorporated herein by reference in its entirety.

BACKGROUND OF THE INVENTION

The present invention relates to devices and methods for stirring (intermixing) at least one liquid, i.e. one or more liquids, and in particular to devices and methods for stirring one or more liquids in a centrifugal system while using centrifugal forces, for example in the field of centrifugal microfluidics.

Centrifugal microfluidics is applied mainly in the field of life sciences, in particular in laboratory analytics. It serves to automate process flows while replacing operations such as pipetting, mixing, measuring, aliquoting and centrifuging. The basic operation of mixing here plays a central part in numerous biochemical applications.

Due to a centrifugal force acting in a radially outward manner, mixtures of liquids and/or of liquids and particles comprising segments of different densities are separated, rather than mixed, on a centrifugal platform. In order to bypass this separating force while nevertheless performing mixing, there are technical solutions that either create a sufficiently convective mixture due to rapid changes in centrifugal acceleration, or that achieve intermixing by means of a counterforce, e.g. a spring or pneumatics, by means of pumping in a reciprocating manner. Here, appropriate geometric structures as obstacles may decisively improve intermixture.

Centrifugal microfluidic platforms were mixing operations are realized by changing the rotational frequency are described in [4] and [5]; in known realizations for mixing on centrifugal platforms, mixing is realized in a purely diffusive manner or by the change in centrifugal acceleration. Stirring may be effected by filling and emptying a compression chamber, as is described in [4], or may be effected directly on account of inertial forces accompanying changes in acceleration, as is described in [5]. A further example of mixing on the centrifugal platform is a Coriolis mixer in accordance with [6]. Here, liquid is transported from a radially inner position to a radially outer position. Intermixture is effected by means of Coriolis forces.

[7] shows a device for mixing in a rotating system, wherein a gas bubble is reciprocated within an ampule. When the centrifuge comes to a halt, the gas bubble moves upward. Due to a specific arrangement of the ampule within the centrifuge, the gas bubble simultaneously moves radially outward. During rotation, the centrifugal force is predominant, and the gas bubble will again move radially inward due to the buoyancy within the liquid. By accelerating and decelerating the centrifuge, the gas bubble is reciprocated, and the liquid is stirred by the movement of the gas bubble. A non-rotating system wherein centrifugal forces are created via a rotating liquid flow is shown in [8]. The gas is added from outside under pressure, stirs the liquid, and is extracted again internally.

Mixing on a centrifugal platform that is realized by the change in centrifugal acceleration is also described in [9]; what is shown is stirring by filling and emptying a compression chamber. In a further example, a mixing pond or a deflectable liquid-tight membrane is periodically filled with liquid and emptied by changes in centrifugal acceleration, see [10]. Due to an obstacle being circumflowed, intermixing is reinforced. Stirring on account of inertial forces accompanying changes in acceleration is demonstrated in [11].

Outside of centrifugal systems, gas bubble reactors are known. Gas bubble reactors are a widely employed method in chemical, biochemical, pharmaceutical, and petrochemical industries. This is due to excellent masses and heat transfer properties with very good mixing properties, as is described in [1].

In microfluidics, gas bubbles within small channels are also used for mixing, as is described in [2]. Here, gas bubbles are located within small channels. Due to surface forces of the gas bubbles, flow profiles are disturbed, and stirring is induced. In addition, application of miniaturized bubble reactors for cultivating cells has been demonstrated in [3]. Here, a gas is introduced into a small reactor so as to provide the cells with nutrients.

Finally, a method of performing radially inward pumping wherein gas is introduced into a system from outside is known from [12].

SUMMARY

According to an embodiment, a method of stirring at least one liquid may have the step of: introducing mutually separate phase volumes into a liquid arranged within a liquid chamber, the liquid chamber being formed within a fluidics module rotatable about an axis of rotation, the mutually separate phase volumes having a different density than the liquid, while the liquid chamber is subject to rotation, so that the phase volumes are moved radially inward or outward in relation to the axis of rotation through the liquid due to the different density of the phase volumes and of the liquid and due to the centrifugal forces caused by the rotation.

Embodiments provide a device for stirring at least one liquid, comprising:
a fluidics module rotatable about an axis of rotation;
a liquid chamber for the liquid within the fluidics module;
means for introducing mutually separate phase volumes of a phase different from the liquid, said phase volumes comprising a different density than the liquid, into the liquid within the liquid chamber; and
a driving device for subjecting the fluidics module to such a rotation that the phase volumes are moved radially inward or outward in relation to the axis of rotation through the liquid due to the different density of the phase volumes and of the liquid and due to the centrifugal forces caused by the rotation.

Embodiments provide a method of stirring at least one liquid, comprising:
introducing mutually separate phase volumes into a liquid arranged within a liquid chamber, the liquid chamber being formed within a fluidics module rotatable about an axis of rotation, the mutually separate phase volumes comprising a different density than the liquid, while the liquid chamber is subject to rotation, so that the phase volumes are moved radially inward or outward in relation to the axis of rotation through the liquid due to the different density of the phase volumes and of the liquid and due to the centrifugal forces caused by the rotation.

Thus, embodiments of the invention relate to devices and methods for stirring one or more liquids on a rotating system, wherein a difference in density between the mutually separate phase volumes and the liquid into which they are introduced is exploited, along with a centrifugal force caused by a rotation, to achieve intermixing of the liquid. In embodiments, several liquids located within the liquid chamber may be stirred. The mutually separate phase volumes are subjected to other centrifugal forces than the liquid(s), so that the mutually separate phase volumes may be caused to move through the liquid, so that intermixing of the liquid(s) may be achieved by convective circumflowing of the mutually separate phase volumes.

In embodiments, a pressure generation means configured to exert a pressure on the phase different from the liquid so as to introduce the mutually separate phase volumes into the liquid is formed on or within the fluidics module. Thus, an external pressure generation means, for example for creating bubbles, is not required.

In embodiments of the invention, the means for introducing comprises a fluid chamber within the fluidics module, said fluidic chamber being fluidically connected to a radially outer portion of the liquid chamber via a fluid line, and a pressure generation means configured to produce, in a gas within the fluid chamber, such overpressure that via the fluid line, gas bubbles are generated within the radially outer portion of the liquid chamber. The driving device may be configured to subject the fluidics module to a rotation such that due to the small density of the gas of the gas bubbles in relation to the liquid, the gas bubbles pass through the liquid and arrive at a radially inner portion of the liquid chamber. Embodiments of the invention thus enable mixing which is based on the principle of gas bubble reactors to be performed in centrifugal microfluidics.

In alternative embodiments of the invention, the liquid may be a first liquid, and the means for introducing may comprise a fluid chamber for a second liquid within the fluidics module and a pressure generation means. The fluid chamber may be fluidically connected to a radially inner portion of the liquid chamber via a fluid line if the second liquid has a larger density than the first liquid, and may be fluidically connected to a radially outer portion of the liquid chamber via a fluid line if the second liquid has a smaller density than the first liquid. The pressure generation means may be configured to generate within the fluid chamber such an overpressure in the second liquid that liquid drops of the second liquid are generated, via the fluid line, within the radially inner or within the radially outer portion of the liquid chamber.

In other embodiments, the phase volumes may be particles, micelles or liposomes.

Thus, embodiments of the invention provide devices and methods for stirring a liquid that can do without rapid change in angular acceleration and can therefore achieve a mixing quality necessitated while being gentle to the system. A sufficiently fast change in the angular acceleration as is necessitated in [4] and in [5], for example, is not necessary, so that embodiments of the invention do not require rotors that enable an appropriately fast change in the angular acceleration. Thus, a reduction in the life cycle of rotors due to such fast changes in the angular acceleration can be avoided. Embodiments of the invention enable this while allowing to achieve a necessitated mixing quality. Embodiments of the invention provide a mixing method that can be performed at a constant centrifugal acceleration.

BRIEF DESCRIPTION OF THE DRAWINGS

Embodiments of the present invention will be explained in more detail below with reference to the accompanying figures, wherein:

FIG. 4 shows a table indicating gassing reactions;

DETAILED DESCRIPTION OF THE INVENTION

Before embodiments of the invention are explained in more detail, it shall initially be noted that embodiments of the present invention are applied, in particular, in the field of centrifugal microfluidics, which is concerned with processing liquids within the nanoliter to milliliter ranges. Accordingly, the fluidics structures may comprise suitable dimensions within the micrometer range for handling corresponding liquid volumes. The fluidics structures (geometric structures) as well as the associated methods are suitable for stirring liquid within centrifuge rotors. The aim of stirring is to improve the homogeneity of a liquid or the homogeneity of a mixture of several liquids.

Whenever the term radial is used here, what is meant is radial in relation to the center of rotation around which the fluidics module and/or the rotor is rotatable. Within the centrifugal field, therefore, a radial direction away from the center of rotation is radially descending, and a radial direction toward the center of rotation is radially ascending. A fluid channel whose beginning is located closer to the center of rotation than its end thus is radially descending, whereas a fluid channel whose beginning is farther away from the center of rotation than its end is radially ascending.

Embodiments of rotational systems will be initially described with reference to FIGS. 6 and 7.

Figure 6:
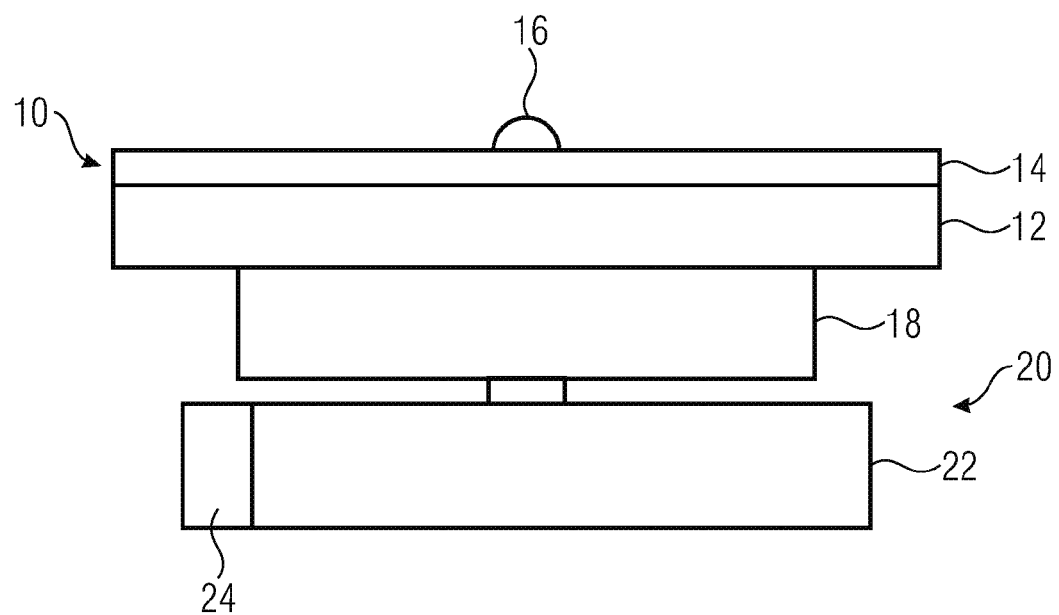
FIGS. 6, 7 show schematic lateral views of rotational systems and/or centrifugal microfluidic platforms for implementing the invention.

FIG. 6 shows a rotational system having a fluidics module 10 in the form of a rotational body comprising a substrate 12 and a lid 14. The substrate 12 and the lid 14 may be circular in a top view, having a central opening above which the rotational body 10 may be mounted on a rotating part 18 of a driving device via a common fixing means 16. The rotating part 18 is pivoted on a stationary part 22 of the driving device 20. The driving device may be a conventional centrifuge with an adjustable rotating speed, or a CD or DVD drive. For example, a control means 24 may be provided which is configured to control the driving device 20 to subject the rotational body 10 to rotations that are necessitated for implementing the invention. As is obvious to a person skilled in the art, the control means 24 may be implemented, for example, by a computing means programmed accordingly or by an application-specific integrated circuit. Moreover, the control means 24 may be configured to control, upon manual inputs by a user, the driving device 20 to cause the necessitated rotations of the rotational body. In any case, the control means 24 is configured to control the driving device 20 to subject the rotational body to the rotations necessitated to implement the invention as it is described here. As the driving device 20, a conventional centrifuge with only one direction of rotation may be used.

The rotational body 10 comprises the necessitated geometric structures and/or fluidics structures. The necessitated fluidics structures may be formed by cavities and channels within the lid 14, within the substrate 12, or within the substrate 12 and the lid 14. In embodiments, for example, fluidics structures may be formed within the substrate 12, while filling holes and vent holes are formed in the lid 14.

Figure 7:
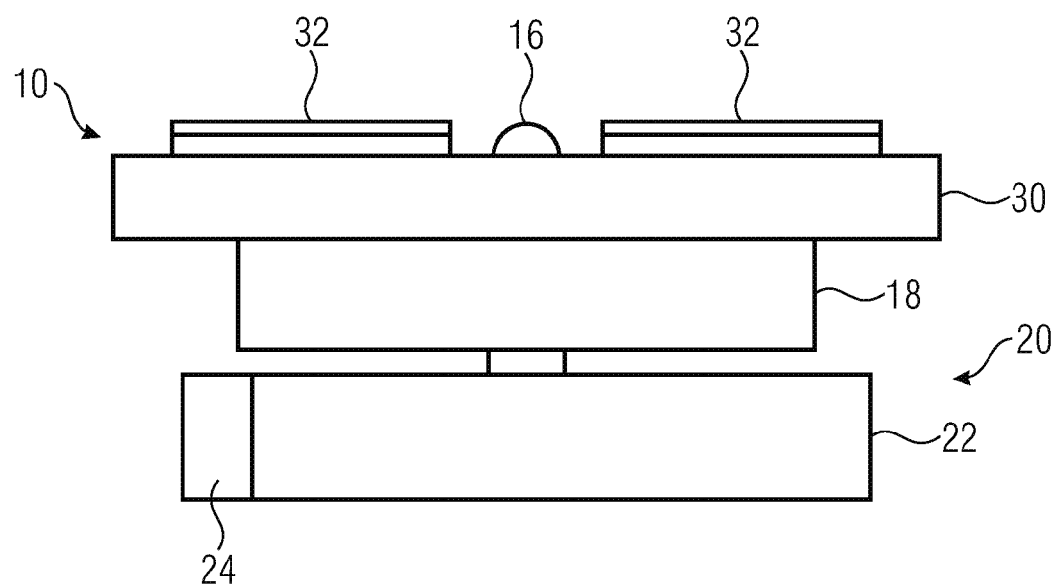

In an alternative embodiment shown in FIG. 7, fluidics modules 32 are inserted into a rotor 30 and along with the rotor 30 form the rotational body 10. The fluidics modules 32 may each comprise a substrate and a lid, which again may have corresponding fluidics structures formed therein. The rotational body 10 formed by the rotor 30 and the fluidics modules 32 in turn may be subjected to a rotation by a driving device 20 controlled by the control means 24.

In embodiments of the invention, the fluidics module and/or the rotational body, which comprises the fluidics structures, may be formed of any suitable material, for example a plastic, e.g. PMMA (polymethyl methacrylate, polycarbonate, PVC, polyvinylchloride) or PDMS (polydimethyl siloxane), glass or the like. The rotational body 10 may be regarded as a centrifugal-microfluidic platform.

In embodiments, the geometric structures and/or fluidics structures within the fluidics module are configured to bring into contact one or more phases for the purpose of stirring them, at least one phase thereof having a different density than one of the other phases. In embodiments of the invention, the phase to be mixed is pressed radially outward or radially inward within a liquid chamber, which may also be referred to as a mixing chamber, while the rotor is centrifugally accelerated. By introducing a further phase having a different density, drops, particles, micelles, liposomes, or bubbles, for example, may be generated. Such phases are referred to as "mutually separate phase volumes" herein. Between said mutually separate phase volumes that have been introduced and the phase to be mixed, a phase boundary is formed which will be maintained while they are transported through the phase to be mixed. The phase volumes introduced may split up into numerous smaller volumes or may join to form larger volume units. If the volume units have a larger density than the liquid(s) to be stirred, they will undergo a "buoyancy" directed radially outward which is due to the gravitational field created by centrifugal acceleration, and they will move radially outward. If they have a smaller density than the liquid(s) to be stirred, they will undergo a buoyancy that is directed inward, and they will move radially inward through the liquid volume. Due to convective circumflowing of the mutually separate phase volumes (for example drops/gas bubbles), stirring of the liquid(s) is achieved here.

In embodiments, flow processes may be created by introducing a further phase, for example a fluid phase, into a liquid chamber, or mixing chamber, accommodating one or more liquids, said flow processes enabling stirring.

In embodiments of the invention, a mass transfer from the phase volumes into the liquid to be mixed may take place during transport of the phase volumes through the liquid to be mixed. Thus, it is possible to introduce substances from the one phase into the other phase in a targeted manner, for example in order to support desired processes in the latter.

Embodiments of the invention provide a system wherein during a first phase, an overpressure is generated within a rotating system. Due to the overpressure, the first phase is transferred into a liquid chamber (mixing chamber) accommodating the liquid to be mixed. Due to buoyancy/downforce in the centrifugal gravitational field within which the liquid chamber is located, mutually separate phase volumes (drops/gas bubbles/particles/micelles/liposomes) are generated from the first phase, which move radially inward or radially outward as a function of density. The buoyancy/downforce generates convective circumflowing of the mutually separate phase volumes of the first phase, which in turn results in the liquid(s) being stirred. In this context, a deflection of the liquid flow, which deflection results from the Coriolis force occurring in rotating systems, may reinforce stirring of the phase to be mixed.

Figure 1:
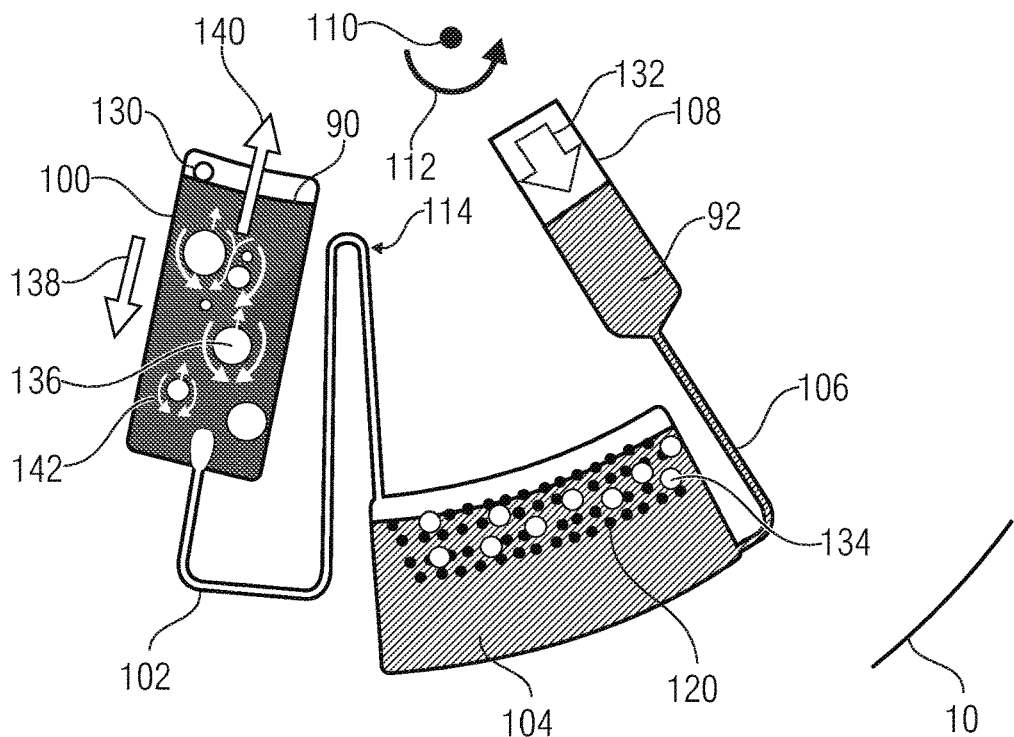
FIG. 1 shows a schematic top view of a fluidics module with a liquid chamber, a fluid chamber, and an inlet chamber.
Figure 2:
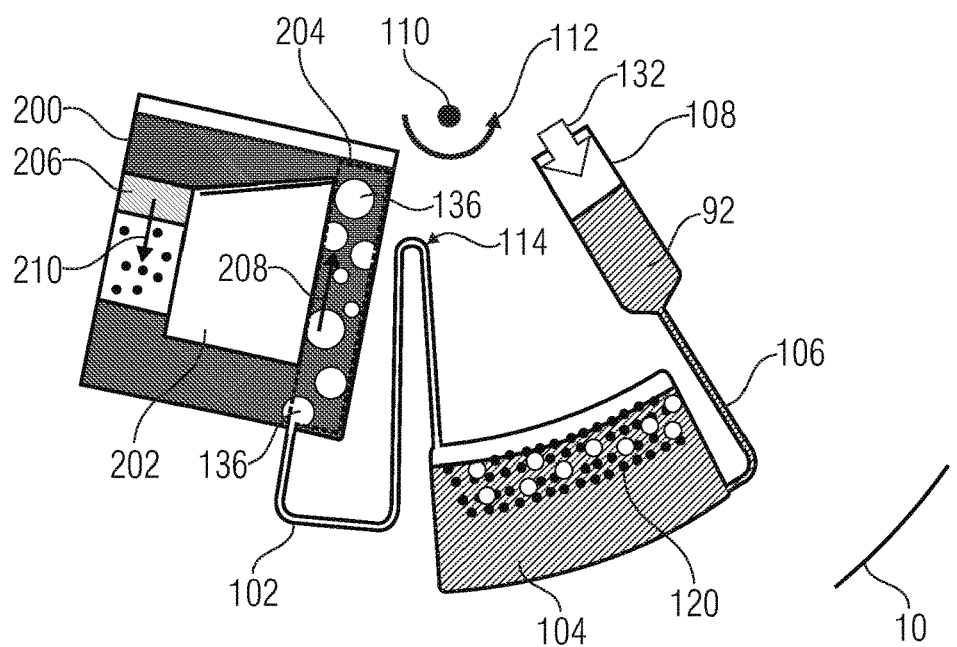
FIG. 2 shows a schematic top view of a fluidics module with a liquid chamber for achieving a mammoth pump effect.

With reference to FIGS. 1-3, fluidics structures will be described below which are suitable for implementing the invention. Corresponding fluidics structures may be implemented in a fluidics module as was described above with reference to FIGS. 6 and 7.

FIG. 1 shows a top view of corresponding fluidics structures formed within a fluidics module. They include a liquid chamber or mixing chamber 100 that is fluidically coupled to a fluid chamber 104 via a fluid channel 102. The fluid chamber 104 is coupled to an inlet chamber 108 via a further fluid channel 106. A center of rotation is designated by reference numeral 110. The liquid chamber 100 comprises a fluid opening 130 serving as an inlet for introducing a liquid into the liquid chamber 100, or as a gas outlet from the liquid chamber 100.

The fluid channel 102 opens into a radially outer portion of the liquid chamber 100, and the fluid opening 130 is arranged in a radially inner portion of the liquid chamber. The fluid channel 102 further opens into the fluid chamber 104 at a radially inner portion. The further fluid channel 106 opens into the fluid chamber 104 at a radially outer portion.

The fluid channel 102 is configured to prevent—when the fluidics module 10 is subjected to rotation, as is indicated by an arrow 112—to prevent liquid from the liquid chamber 100 to pass into the fluid chamber 104. For this purpose, the fluid channel 112 may comprise a siphon 114, as is shown in FIG. 1. In alternative embodiments, the fluid channel may comprise a different suitable valve that prevents liquid from the liquid chamber 100 to pass into the fluid chamber 104.

In the embodiment shown, a reactant 120 is arranged within the fluid chamber 104, said reactant 120 causing a gassing reaction, for example, upon contact with a liquid. The reactant (catalyst) may be provided on wall portions of the fluid chamber 104. For example, the reactant 120 may be arranged on radially inner wall portions of the fluid chamber 104, as is shown in FIG. 1. In embodiments, the reactant 120 may have $MnO_2$ as the catalyst, which leads to the following chemical reaction upon contact with hydrogen peroxide ($H_2O_2$): $2\ H_2O_2 \rightarrow 2\ H_2O + O_2$. The inlet chamber 108, the further fluid channel 106, and the reactant 120 may be regarded as a pressure generation means.

In operation, a liquid 90 to be mixed, or several liquids 90 to be mixed, is/are introduced into the liquid chamber 100. Introduction may be effected in a centrifugal manner either via the fluid opening 130 or may be effected via further fluidics structures (not shown) within the fluidics module 10. A further liquid 92, $H_2O_2$ in the embodiment shown, is introduced into the inlet chamber 108, as is depicted by an arrow 132. In this context, the volume of the inlet chamber 108 may be larger than the volume of the fluid chamber 104. Subsequently, the fluidics module 10 is subject to rotation 112. As a result, the further liquid 92 is centrifugally driven from the inlet chamber 108 into the fluid chamber 104 and comes into contact with the reactant 120. Said reactant 120 acts as a catalyst, as a result of which gas is generated within the fluid chamber 104, as is indicated by bubbles 134 in FIG. 1. Due to the lower density of the gas, said gas collects in the radially inner area of the fluid chamber, which results in an overpressure within the fluid chamber. Due to this overpressure, gas bubbles 136 are generated in the liquid within the liquid chamber 100 via the fluid line 102. The overpressure within the fluid chamber 104 may be adjusted accordingly, so as to cause tearing of gas bubbles at the location where the fluid channel 102 opens into the liquid chamber 100. Due to the difference in density between the liquid 90 located within the liquid chamber 100 and the gas bubbles 136, the liquid is accelerated outward 138 by a centrifugal force, whereas the gas bubbles 136 are moved radially inward through the liquid 90, arrow 140. In this context, convective circumflowing of the gas bubbles takes place, as is depicted by arrows 142. As a result of this convective circumflowing of the gas bubbles, mixing of the liquid(s) 90 located within the liquid chamber 100 takes place.

In order to obtain corresponding stirring it is sufficient to subject the fluidics module 10 to a constant rotational frequency during the entire mixing process. Accordingly, a driving device configured to rotate the fluidics module 10 may be configured and/or programmed to subject the fluidics module 10 to a constant rotational frequency during the mixing process.

Thus, in the embodiment shown in FIG. 1, hydrogen peroxide is converted to water and oxygen by using a catalyst (e.g. manganese dioxide) on a rotating fluidics module, which may also be referred to as a cartridge. Due to the developing gaseous oxygen, a gas overpressure results, and gas enters the liquid chamber 100 (mixing chamber) via the fluid channel 102 ($O_2$ connection channel). Within the mixing chamber, the introduction of $O_2$ gas results in gas bubbles which are transported radially inward due to buoyancy. Thus, for example, a sample may be mixed with a lysis buffer within the mixing chamber. Bacteria, viruses, plant cells or human cells may be opened up so as to liberate the DNA. At a later point in time, a binding buffer may be added, and mixing may be continued with the bubble mixer so as to prepare a binding step for an affinity-chromatographic binding/washing elution process.

In addition to the mixing effect, a mass transfer from the phase that has been introduced into the phase that is to be mixed may also take place. Within the fluid chamber 104, oxygen will collect at a radially inner position. Water and $H_2O_2$ will also evaporate, so that the gas space of $O_2$ and $H_2O_2$ and $H_2O$ is vapor having a concentration below or equal to the saturation state. When the bas bubbles flow through the mixing chamber, $H_2O_2$ will dissolve in the liquid and/or in the mixture within the liquid chamber 100. It has been shown that this supports the lysis process when the liquids to be mixed are a sample and a lysis buffer, for example. In embodiments, the device and/or the method may be configured to dissolve (small) amounts of the one phase within the phase to be mixed, and to distribute, by means of mixing, the dissolved substance in the phase to be mixed.

FIG. 2 shows a top view of a fluidics module which has a liquid chamber 200 comprising a different design formed therein. The remaining components correspond to those described above with reference to FIG. 1, so that repeated description thereof will be dispensed with. In the example shown in FIG. 2, the liquid chamber 200 is implemented to realize stirring while exploiting a so called mammoth pump effect. In this context, the liquid chamber 200 has an obstacle 202 provided therein which subdivides the liquid chamber into a first area 204 represented by a dotted line, and a second area constituted by the remaining area. On that side of the obstacle 202 which is located opposite the first area 204, a processing means 206 may be provided. Said processing means may be a filter, for example. In embodiments, the processing means 206 may be an extraction matrix for nucleic acid extraction.

Due to the gas bubbles 136, a lower average density is realized in the area 204 than in the remaining area of the liquid chamber, or mixing chamber, 200. This results in buoyancy 208 and, thus, in a flow that moves around the obstacle 202, as is indicated by an arrow 210. The circulation of the liquid around the obstacle 202 effects additional stirring. Moreover, due to this circulation, the liquid may be moved through an optional processing means 206. Thus, provision of the obstacle 202 achieves a mammoth pump effect by means of which the phase to be mixed is pumped radially inward, so that circulation of liquid around the obstacle results. Via an obstacle formed by the processing means 206, for example a porous extraction matrix, the liquid is led radially outward again. Thus, multiple separation or multiple filtering may be performed.

Figure 3A:
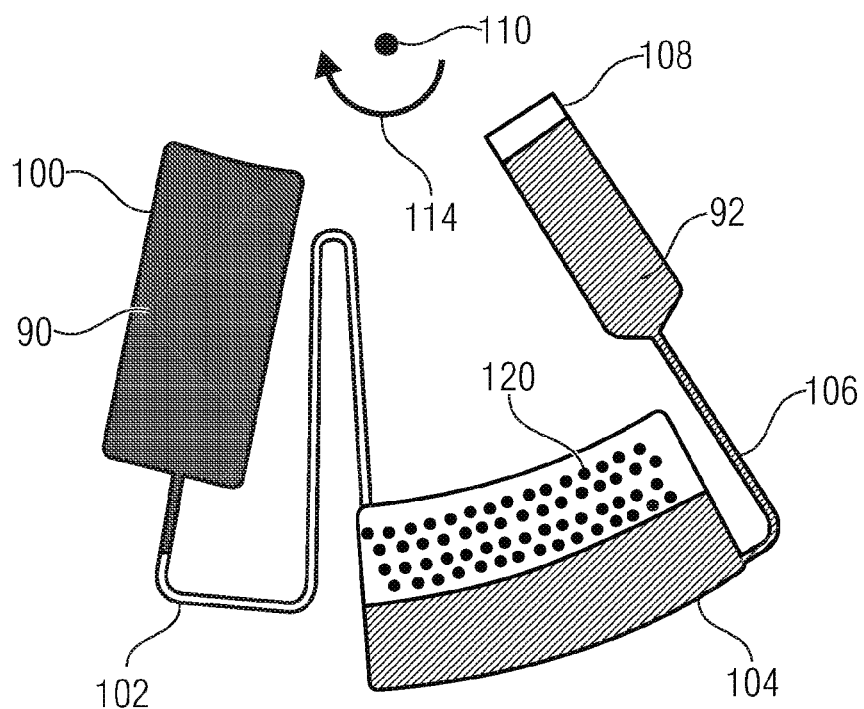
FIGS. 3*a*, 3*b* show schematic top views for illustrating a controllable device for stirring a liquid.
Figure 3B:
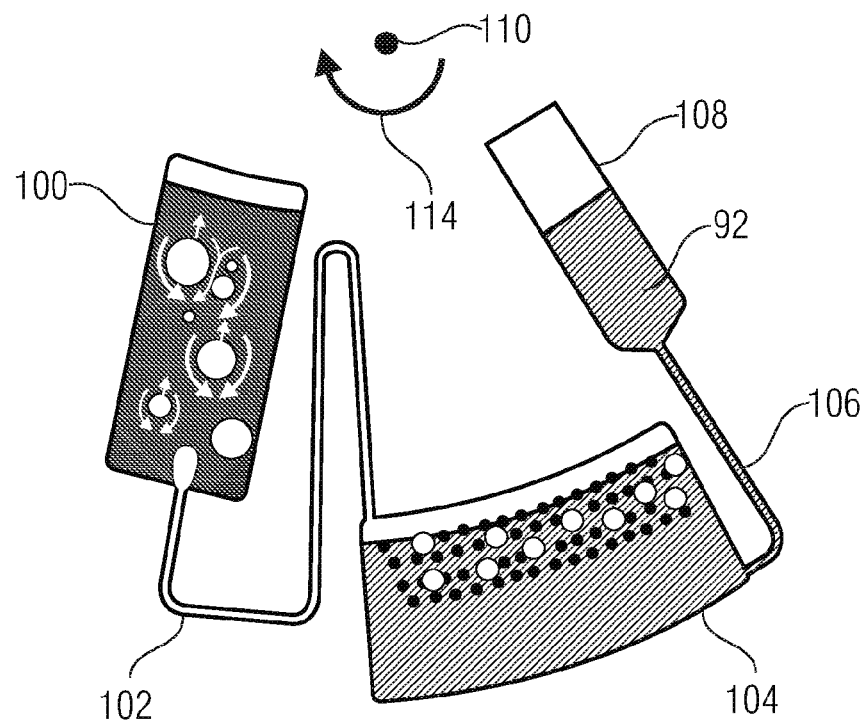

In embodiments, the gassing rate may be controlled via the centrifugal acceleration and, thus, via the rotational frequency. FIGS. 3a and 3b show such a functional principle while using fluidics structures as were described above with reference to FIG. 1. Therefore, repeated description of said structures is omitted. FIG. 3a shows a state wherein the further liquid 92, which is introduced via the inlet chamber 108, is not in contact with the reactant 120, so that no gassing occurs. The liquid 90 to be mixed is introduced into the liquid chamber 100, and the further liquid 92 is introduced into the inlet chamber 108. By means of the liquid 90 and 92, a gas volume is entrapped within the fluid channel 102 and the fluid chamber 104. This entrapped gas volume is compressed within the fluid chamber 104, which may be referred to as a compression chamber, by a centrifugal acceleration, caused by the reaction 114, and by a column of liquid, caused by the liquid 92. The direction of rotation is irrelevant here, FIGS. 3a and 3b showing a direction of rotation that is opposite to the direction of rotation shown in FIG. 1.

Due to the compression of the gas within the fluid chamber 104, the filling level of the liquid 92 within the fluid chamber may be adjusted. If the catalyst is located only on radially inner wall portions of the fluid chamber, the gassing rate may thus be adjusted via a filling level controlled by centrifugal acceleration. In the state shown in FIG. 3a, the liquid 92 is not in contact with the reactant 120, so that no gas is generated and no gas bubbles are generated in the liquid 90 located within the liquid chamber 100. Thus, FIG. 3a shows that given little centrifugal acceleration, the gas within the fluid chamber 104 is not sufficiently compressed, so that the filling level of the liquid 92 for bubble generation does not reach the catalyst 120, and no gas is generated. Wth increasing centrifugal acceleration, the gas within the fluid chamber 104 is compressed. The filling level increases, and once the rotational speed exceeds a threshold of rotation, said filling level reaches the catalyst 120, and gas is generated. The gas pressure increases, and gas bubbles are transferred into the liquid chamber 100, where stirring occurs. This state is shown in FIG. 3b. The bubble generation process may be interrupted by reducing the centrifugal acceleration, i.e. by reducing the rotational frequency, since the gas volume within the fluid chamber 104 will then expand again and will drive back the liquid 92 into the inlet chamber 108. In embodiments, the filling level within the fluid chamber 104 may be controlled such that bubble generation cannot only be switched on or off, but that percentage control of the bubble generation is possible.

In embodiments of the invention, the fluidics module thus has a pressure generation means implemented therein via which mutually separate phase volumes, e.g. bubbles, are generated, so that no external pressure generation means or bubble generation means needs to be provided.

In embodiments, the centrifugal bubble column may also be exploited for liquid extraction. For example, proteins may be extracted from an aqueous CTBA solution with phenol/chloroform. In a further example of use, the convectively moved phases may be used for flotation. In addition, the various phases may have reagents added to them which—when the phases come into contact—interact or react with one another so as to determine the mixing quality, e.g. FRET dyes or pH-sensitive dyes.

Embodiments have been explained above wherein the pressure generation means is configured to generate an overpressure by means of a chemical conversion within the fluidics module. In addition to the chemical gas production described, any suitable chemical gas production may be used. Alternatives are nitrogen production, for example via ammonium nitrite converted to water, oxygen and nitrogen, or carbon dioxide production, for example via calcium carbonate which reacts with hydrogen chloride to yield calcium chloride, water and carbon dioxide, or hydrogen production, where, e.g., magnesium and water react to form magnesium hydroxide and hydrogen.

In alternative embodiments, the pressure generation means may be configured to effect the overpressure by means of electrochemical generation of gas. For example, water may be split up into hydrogen and oxygen by means of electrolysis. The product gas may then by introduced into a mixing chamber and cause the desired mixing effect.

As another alternative, the pressure generation means may comprise a pressure reservoir wherein gas is provided under pressure and gradually released in order to generate bubbles. For example, such a pressure reservoir may be inserted into a fluidics module.

Further examples of gassing reactions which may be used in the pressure generation means are represented in the table of FIG. 4. Said table shows gassing reactions, the ratio of a generated gas volume V2 to an initial reagent volume V1, and the hazard potential of the educts or products.

Figure 5:
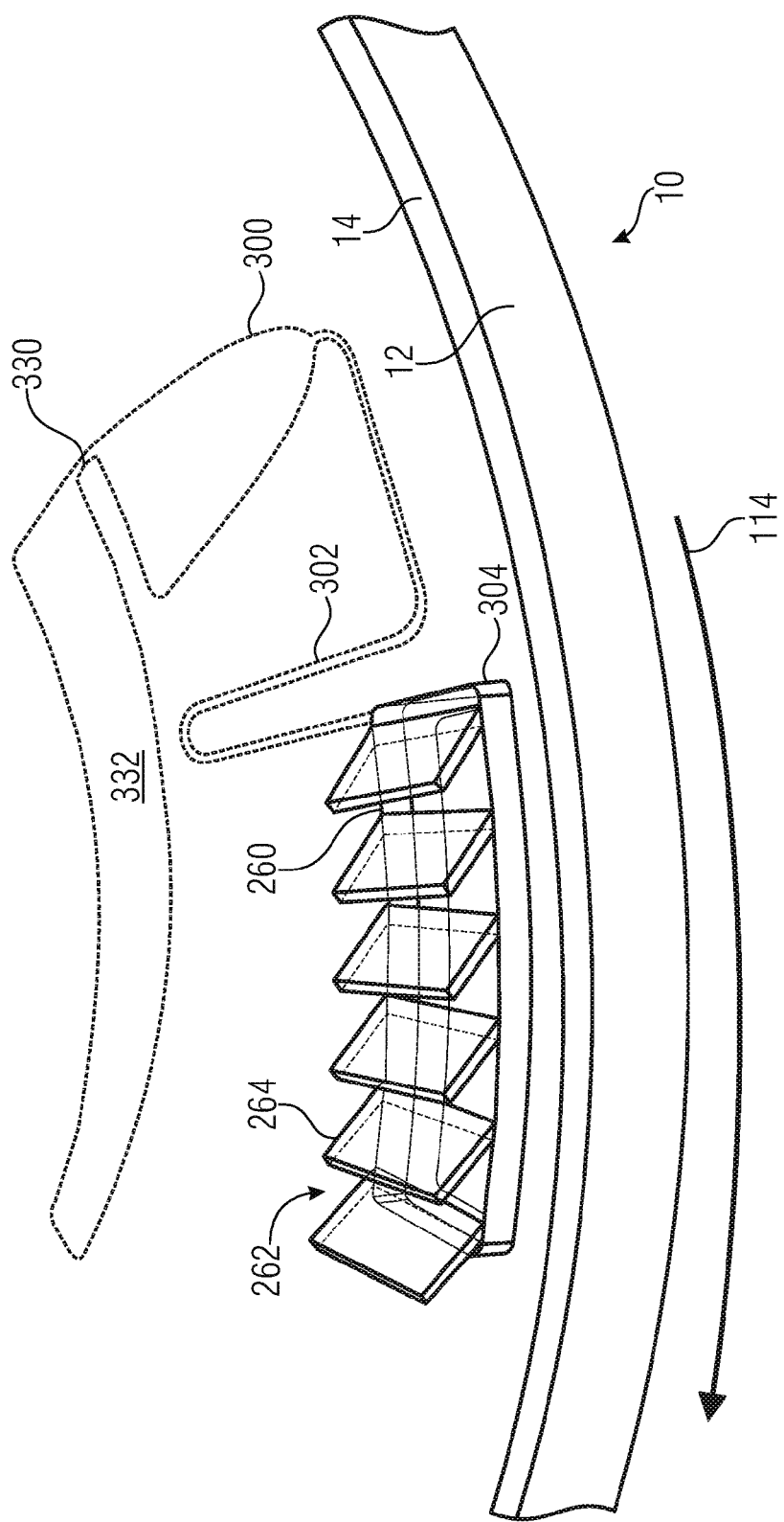
FIG. 5 shows a schematic top view of a fluidics module with a pressure generation means comprising a fan structure.

In alternative embodiments, the pressure generation means may be configured to produce the overpressure, which is necessitated for producing the mutually separate phase volumes, by means of a centrifugal force caused by rotating the fluidics module. An embodiment of such a device is shown in FIG. 5. FIG. 5 shows a fluidics module 10 in the form of a rotational body comprising a substrate 12 and a lid 14. The lid 14 has a recess 260 formed therein within or above which a fan structure or spoiler structure 262 is arranged. In the example shown, the fan structure 262 comprises slanting lamellas. Below the opening 260, a fluid chamber 304 is formed within the substrate 12. The fluid chamber 304 is connected to a liquid chamber or mixing chamber 300 via a fluid line 302. The liquid chamber 300 comprises a fluid opening 330 for gas venting and/or for being filled with a liquid. The vent hole 300 may be fluidically coupled to a vent chamber and/or filling chamber 332, as is depicted.

Upon rotation 114 of the fluidics module in the direction shown, a gas pressure is generated within the fluid chamber 304 arranged below the opening 260 by the positions of the lamellas 264 of the fan structure 262, said gas pressure resulting, via the fluid line 302, in a bubble generation in a liquid arranged within the liquid chamber 300. In the embodiment shown in FIG. 5, gas pressure generation is thus realized via rotation of the fluidics module 10 with a spoiler or fan structure. In this case, the structure may also be used for concentrating particles, pollen and/or bacteria from the air as atmospheric germ collectors. The air flows into the liquid chamber, or mixing chamber, 300 through the fan structure 262, and stirring results; any entrained particles, bacteria and/or pollen can be concentrated in the liquid phase arranged within the liquid chamber 300. These may subsequently be detected. The introduction of air bubbles can be stopped by deceleration or reversal of the direction of rotation. In embodiments, the pressure generation means may thus comprise a fan structure configured to rotate about the rotational axis with the fluidics module and to convey ambient air into the fluid chamber. Ambient gases may be brought into contact with a liquid phase in the process.

Thus, embodiments of the present invention are advantageous in that it is possible to perform mixing on a centrifugal platform at a constant rotational frequency. As a result, the bearings of the driving device, i.e. of the processing equipment, can be protected, and the necessitated power input via the shaft is smaller. Consequently, energy-efficient applications for battery-operated equipment may be realized. Moreover, embodiments of the invention probably enable better and faster stirring than may be achieved with conventional methods.

Thus, essential disadvantages of the known technology of mixing operations on centrifugal microfluidic platforms, wherein a change in the centrifugal acceleration is necessitated in order to achieve stirring, can be overcome. In embodiments of the invention, the processing equipment, in particular the rotor, does not need to provide a change in the centrifugal acceleration; in particular, widely spread standard laboratory centrifuges cannot accomplish rapid change in the centrifugal acceleration. Embodiments of the invention are suitable for being used with such widely spread standard laboratory centrifuges. Since frequent changes in the acceleration are not required in embodiments of the invention, higher stresses and, thus, a reduction of the life cycle of the centrifuge, can be avoided.

The known technology of gas bubble reactors of process engineering has allowed only limited miniaturization since in miniaturization, buoyancy forces become disproportionately small as compared to surface forces and viscous forces. Wth a certain miniaturization, the buoyancy of gas bubbles is not sufficient for achieving stirring. Embodiments of the invention enable to reinforce the buoyancy forces via centrifugal forces and thus to provide, in miniaturization, buoyancy forces that are sufficient for stirring. In embodiments, this is combined with providing a gassing reaction on the platform (on-chip gas source) and a method of transferring the gas into the reaction chamber, so that no gas needs to be fed into the system externally.

In other words, embodiments of the invention provide a bubble column reactor on a centrifugal platform for stirring purposes. Via centrifugal force, buoyancy may be increased by a factor of z. This may result in that even with miniaturization, a flow sufficiently strong for stirring is generated. Moreover, in embodiments of the invention, integration of an integrated on-chip gas source for overpressure generation represents a further innovation. A siphon may serve as a connection channel to a mixing chamber. Within a mixing chamber, a liquid phase may be mixed by introducing a second, immiscible phase, the overall system being rotated.

In yet other words, embodiments of the invention provide a method of mixing a liquid within a centrifuge, wherein stirring in one or more phases (liquids) is achieved by introducing a first phase, the first phase being immiscible with the other phase, there existing a difference in densities between the first and at least one of the other phases, stirring being achieved by a flow process in the other phases which is achieved by introducing the first phase into the other phases, the flow process being caused by a buoyancy based on a difference in densities between the first phase and the other phase, and the buoyancy being achieved by rotating the system. In such a method, stirring may be effected by direct the other phases being circumflowed by bubbles/drops of the first phase. In such a method, a change in the average density may be achieved by introducing the first phase into the other phase within a relatively large area consisting of several sections of the first and second phases. The buoyancy or downforce of a relatively large area consisting of the first phase and the other phases may result in a mammoth pump effect, so that the other phases are pumped. By suitable geometric structures, stirring may be achieved. In such embodiments, the first phase may comprise a smaller density than the phases to be mixed, or it may have a larger density than the phases to be mixed. A gas pressure may be generated by means of a chemical conversion directly on the rotating platform. A gas pressure may alternatively be generated by an electrochemical conversion directly on the rotating platform. Moreover, an overpressure of the first phase may be realized by an overpressure arising in the first phase upon rotation of the system. Finally, a system for controlling a gassing rate may be provided by a compression chamber and siphon-type structures.

Even though embodiments, in particular devices, for moving gas bubbles radially inward through one or more liquids within the liquid chamber have been described above, it is obvious to a person skilled in the art that these may readily be adapted for embodiments wherein the mutually separate phase volumes are also a liquid phase comprising a smaller or larger density than the liquid to be mixed. Corresponding pressure generation means for such liquids may be provided. If the mutually separate phase volumes have higher densities than the liquid(s) to be mixed, they will be introduced into a radially inner portion of the liquid chamber. For example, a corresponding fluid channel may open into a corresponding radially inner portion of the liquid chamber. Alternatively, if the mutually separate phase volumes are solids, suitable means may be provided for introducing said solids into a radially inner or radially outer portion of the liquid chamber as a function of their densities, so that they are moved through the liquid in a radially outward or a radially inward manner by means of a centrifugal force so as to be convectively circumflowed so as to cause the liquid to be mixed.

In embodiments of the invention, more than one, two, or more than two liquids may be arranged within the liquid chamber, so that the mutually separate phase volumes are moved by the one, two, or more than two liquids, so that said liquids are stirred accordingly.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

[1] N. Kartarci et al., "Bubble column reactors", Process Biochemistry, 40 (2005) pp. 2263-2283
[2] P. Garstecki et al., "*Mixing with bubbles: a practical technology for use with portable microfluidic devices*", Lab Chip, 2006, 6, pp. 207-212
[3] S. Demming, et al., "*Vertical microbubble column—A photonic lab-on-chip for cultivation and online analysis of yeast cell cultures*", BIOMICROFLUIDICS 6, 034106, (2012)
[4] Z. Noroozi et al., "Reciprocation flow-based centrifugal microfluidic mixer", Review of Scientific Instruments 80, (2009), 75102
[5] M. Grumann et al., "*Batch-mode mixing on centrifugal microfluidic platforms*", Lab on a Chip 5, (2005) pp. 560-565
[6] Jens Ducree et al., "*Patterning of flow and mixing in rotating radial microchannels*", Microfluidics and Nanofluidics, 2, pp. 97-105, (2006)
[7] U.S. Pat. No. 5,511,880
[8] U.S. Pat. No. 573,975
[9] U.S. Pat. No. 8,057,757 B2
[10] WO 2011/117148 A1
[11] WO 2011/144396 A1
[12] C. Matthew, "Pneumatically Pumping Fluids Radially Inward On Centrifugal Microfluidic Platforms in Motion", Anal. Chem., (82), pp. 8039-8041, 2010

The invention claimed is:

1. A method of stirring at least one liquid, comprising:
   providing a fluidics module comprising a fluid chamber and a liquid chamber, said fluid chamber being fluidically connected to a radially outer portion of the liquid chamber via a fluid line,
   subjecting the fluidics module to rotation about an axis of rotation and generating, in a gas within the fluid chamber, an overpressure such that separate gas bubbles are introduced into at least one liquid arranged within the liquid chamber via the fluid line, the gas of the separate gas bubbles having a smaller density than the at least one liquid,
   wherein while the fluidics module is subject to said rotation, the separate gas bubbles are moved radially inward in relation to the axis of rotation of the fluidics module through the at least one liquid due to the smaller density of the gas bubbles and due to the centrifugal forces caused by the rotation,
   wherein, while the fluidics module is subject to said rotation, the at least one liquid is prevented from passing through the fluid line from the liquid chamber into the fluid chamber.

2. The method as claimed in claim 1, wherein the at least one liquid comprises two liquids arranged within the liquid chamber, which are mixed by the movement of the separate gas bubbles.

3. The method as claimed in claim 1, wherein the overpressure is generated by means of chemical or electrochemical reaction within the fluid chamber.

4. The method as claimed in claim 1, wherein the overpressure is generated by means of chemical reaction within the fluid chamber, wherein reaction liquid is brought into contact with a reactant within the fluid chamber to cause the chemical reaction within in the fluid chamber.

5. The method as claimed in claim 4, comprising:
introducing the reaction liquid into an inlet chamber of the fluidics module, said inlet chamber being fluidically connected to a radially outer area of the fluid chamber via a fluid line, rotating the fluidics module so that the reaction liquid is driven into the fluid chamber by means of a centrifugal force and entraps a gas volume within the fluid chamber.

6. The method as claimed in claim 5, comprising:
adjusting a filling level of the reaction liquid in the fluid chamber and thereby the percentage of the reactant that comes into contact with the reaction liquid by changing a rotational frequency of the rotation with which the fluidics module is rotated.

7. The method as claimed in claim 1, wherein the overpressure is generated by rotation of the fluidics module in that a pressure liquid compresses a gas located within the fluid chamber by means of a centrifugal force, and/or in that gas is driven into the fluid chamber by a fan structure upon rotation of the fluidics module.

8. The method as claimed in claim 1, comprising:
providing the fluidics module with an obstacle within the liquid chamber so that introducing the separate gas bubbles into the liquid chamber while the fluidics module is subject to said rotation causes circulation of the at least one liquid around the obstacle.

9. The method as claimed in claim 1, wherein during the movement of the separate gas bubbles through the at least one liquid, a substance is dissolved from the separate gas bubbles and distributed the at least one liquid.

10. The method as claimed in claim 9, wherein the at least one liquid comprises two liquids arranged within the liquid chamber, which are mixed by the movement of the separate gas bubbles, the two liquids comprise a sample liquid and a lysis buffer, wherein the substance is $H_2O_2$ dissolving into the sample liquid and into the lysis buffer from the separate gas bubbles.

11. A method of stirring at least one liquid, comprising:
providing a fluidics module comprising a fluid chamber and a liquid chamber, said fluid chamber being fluidically connected to a radially inner portion of the liquid chamber via a fluid line,
subjecting the fluidics module to rotation about an axis of rotation and generating, in a second liquid in the fluid chamber, an overpressure such that separate drops of the second liquid are introduced into a first liquid arranged within the liquid chamber via the fluid line, the second liquid having a larger density than the first liquid,
wherein, while the fluidics module is subject to said rotation, the separate drops of the second liquid are moved radially outward in relation to the axis of rotation of the fluidics module through the first liquid due to the larger density of the second liquid and due to the centrifugal forces caused by the rotation,
wherein, while the fluidics module is subject to said rotation, the first liquid is prevented from passing through the fluid line from the liquid chamber into the fluid chamber.

\* \* \* \* \*